United States Patent
Anan et al.

[11] Patent Number: 5,883,152
[45] Date of Patent: Mar. 16, 1999

[54] CONTACT LENS

[75] Inventors: Keizo Anan, Oita; Yoshishige Murata, Tsukuba; Naoyuki Amaya, Tsukuba; Tuyoshi Miyazaki, Tsukuba, all of Japan

[73] Assignee: Nippon Oil and Fats Co., Ltd., Tokyo, Japan

[21] Appl. No.: 882,660

[22] Filed: Jun. 25, 1997

Related U.S. Application Data

[63] Continuation of Ser. No. 195,598, Feb. 14, 1994, abandoned, which is a continuation of Ser. No. 987,982, Dec. 9, 1992, abandoned, which is a continuation of Ser. No. 576,555, Aug. 31, 1990, abandoned.

[30] Foreign Application Priority Data

| Oct. 31, 1989 | [JP] | Japan | 1-281940 |
| Oct. 31, 1989 | [JP] | Japan | 1-281941 |
| Oct. 31, 1989 | [JP] | Japan | 1-281942 |

[51] Int. Cl.$^6$ .............. G02C 7/04; C08F 18/20
[52] U.S. Cl. ............ 523/106; 523/107; 523/108; 526/242; 526/279; 526/292.4; 351/160 R
[58] Field of Search .............. 523/106, 107, 523/108; 526/279, 242, 292.4; 351/160 R

[56] References Cited

U.S. PATENT DOCUMENTS

| 4,686,267 | 8/1987 | Ellis et al. ............... 351/160 R |
| 4,743,106 | 5/1988 | Novicky ............... 351/160 R |
| 4,948,854 | 8/1990 | Amaya et al. ............... 526/292.4 |
| 4,996,275 | 2/1991 | Ellis et al. ............... 351/160 R |
| 5,032,658 | 7/1991 | Baron et al. ............... 526/242 |

FOREIGN PATENT DOCUMENTS 9011306  10/1990  WIPO ............... 523/106

*Primary Examiner*—Andrew E. C. Merriam
*Attorney, Agent, or Firm*—Darby & Darby

[57] ABSTRACT

A contact lens contains a copolymer obtained by copolymerizing, as an indispensable feed monomer, 2 to 95 wt. % of a carboxylic acid ester monomer and 98 to 5 wt. % of a copolymerizable monomer. The carboxylic acid ester monomer is represented by the formula (I)

$$CH_2 = \underset{X}{\underset{|}{C}} - COO(CH_2)_n - R_1 \qquad (I)$$

wherein $R_1$ stands for a hydrogen atom, an alkyl group having 1 to 12 carbon atoms, an alkenyl group having 1 to 12 carbon atoms, a cyclic alkyl group having 3 to 12 carbon atoms or an aryl group, and X stands for $$\begin{array}{l} |\\ CH_2\\ |\\ CH_2COO(CH_2)_m - R_2, \end{array}$$

$$\begin{array}{l} |\\ CH_2\\ |\\ CHCOO(CH_2)_m - R_2\\ |\\ CH_2COO(CH_2)_l - R_3, \end{array}$$

$$\begin{array}{l} |\\ CHCOO(CH_2)_m - R_2\\ |\\ CH_2COO(CH_2)_l - R_3 \end{array}$$

or $$\begin{array}{l} |\\ CHCOO(CH_2)_m - R_2\\ |\\ CHCOO(CH_2)_l - R_3\\ |\\ CH_3 \end{array}$$

in which $R_2$ and $R_3$ each stand for a hydrogen atom, an alkyl group having 1 to 12 carbon atoms, an alkenyl group having 1 to 12 carbon atoms, a cyclic alkyl group having 3 to 12 carbon atoms or an aryl group, m and l being integers of from 0 to 4, at least one of $R_1$, $R_2$ and $R_3$ being a group containing a fluorine atom and n being an integer of from 0 to 4.

5 Claims, No Drawings

CONTACT LENS

This application is a continuation of application Ser. No. 08/195,598 filed Feb. 14, 1994, now abandoned, which, in turn, is a continuation of Ser. No. 07/987,982 filed Dec. 9, 1992, now abandoned, which, in turn, is a continuation of Ser. No. 07/576,555 filed Aug. 31, 1990, now abandoned.

BACKGROUND OF THE INVENTION

This invention relates to a contact lens and, more particularly, to a contact lens having, above all, an excellent oxygen permeability.

Contact lenses now in extensive use may be classified into an oxygen-permeable hard contact lens, referred to hereinafter as a GP contact lens, and a water-containing soft contact lens. The water-containing soft contact lenses, which may be worn more comfortably, are unsatisfactory in oxygen permeability of the lens material. While it may be contemplated to raise the water content of the lens material to thereby raise its oxygen permeability, such lens may be contaminated easily by bacteria, according to recent clinical reports, to cause serious complications to cornea or conjunctiva. The GP contact lenses, on the other hand, have been highly evaluated because of high oxygen permeability, astigmatism curative effects, durability and safety, and have come to be used predominantly as the contact lenses. In keeping therewith, studies and investigations of the GP hard contact lenses are progressing briskly. However, special emphasis is put only on the oxygen permeability of the conventional GP contact lenses with disregard to other properties required of the contact lenses.

For example, the contact lenses described in Japanese Laid-open Patent Applications Nos. 8769/1987, 61928/1987 and 36646/1988 are excellent in oxygen permeability, but are unsatisfactory in shape stability or resistance to contamination. On the other hand, the contact lenses disclosed in Japanese Laid-open Patent Application Nos. 99720/1987 and 212618/1987 are formed of dialkyl fumarate, which is poor in copolymerizability and, even when it is copolymerized ultimately, it is so brittle that it can be cracked easily, causing danger to users. The contact lens disclosed in Japanese Laid-open Patent Application No. 176909/1986 is low in oxygen permeability and unsuitable for continuous wearing in the eye, to which special attention has been directed recently.

SUMMARY OF THE INVENTION

It is therefore an object of the present invention to provide an oxygen permeable contact lens which is superior in optesthesia improving effects and which may be worn continuously for prolonged time.

It is another object of the present invention to provide a contact lens which is excellent in shape stability and durability.

It is a further object of the present invention to provide a contact lens which is excellent in resistance to contamination and capable of preventing protein, lipids or inorganic substances from being deposited on the lens surface.

The above and other objects of the present invention will become more apparent from the following detailed description of the present invention.

In accordance with the present invention, there is provided a contact lens comprising a copolymer obtained by copolymerizing, as an indispensable feed monomer, 2 to 95 wt. % of a carboxylic acid ester monomer and 98 to 5 wt. % of a copolymerizable monomer, the carboxylic acid ester monomer being represented by the formula (I)

$$CH_2=C-COO(CH_2)_n-R_1 \qquad (I)$$
$$\quad\;\;|$$
$$\quad\;\;X$$

wherein $R_1$ stands for a hydrogen atom, an alkyl group having 1 to 12 carbon atoms, an alkenyl group having 1 to 12 carbon atoms, a cyclic alkyl group having 3 to 12 carbon atoms or an aryl group, and X stands for

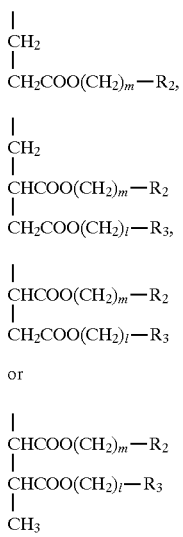

$$\;\;\;\;|$$
$$CH_2$$
$$\;\;|$$
$$CH_2COO(CH_2)_m-R_2,$$

$$\;\;\;\;|$$
$$CH_2$$
$$\;\;|$$
$$CHCOO(CH_2)_m-R_2$$
$$\;\;|$$
$$CH_2COO(CH_2)_l-R_3,$$

$$\;\;\;\;|$$
$$CHCOO(CH_2)_m-R_2$$
$$\;\;|$$
$$CH_2COO(CH_2)_l-R_3$$

or $$\;\;\;\;|$$
$$CHCOO(CH_2)_m-R_2$$
$$\;\;|$$
$$CHCOO(CH_2)_l-R_3$$
$$\;\;|$$
$$CH_3$$

in which $R_2$ and $R_3$ each stand for a hydrogen atom, an alkyl group having 1 to 12 carbon atoms, an alkenyl group having 1 to 12 carbon atoms, a cyclic alkyl group having 3 to 12 carbon atoms or an aryl group, m and l being integers of from 0 to 4, at least one of $R_1$, $R_2$ and $R_3$ being a group containing a fluorine atom and n being an integer of from 0 to 4.

DESCRIPTION OF THE PREFERRED EMBODIMENTS

The contact lens of the present invention is characterized in that it contains a copolymer in which a specific carboxylic acid ester monomer is copolymerized as an essential starting or feed monomer with a copolymerizable monomer.

The specific carboxylic acid ester monomer employed in the present invention is represented by the formula

$$CH_2=C-COO(CH_2)_n-R_1 \qquad (I)$$
$$\quad\;\;|$$
$$\quad\;\;X$$

wherein $R_1$ stands for a hydrogen atom, an alkyl group having 1 to 12 carbon atoms, an alkenyl group having 1 to 12 carbon atoms, a cyclic alkyl group having 3 to 12 carbon atoms or an aryl group , and X stands for

$$\;\;\;\;|$$
$$CH_2$$
$$\;\;|$$
$$CH_2COO(CH_2)_m-R_2,$$

-continued

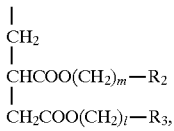

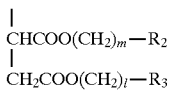

or

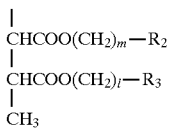

wherein $R_2$ and $R_3$ each stand for a group which is the same as or different from $R_1$ and m and l each stand for an integer of from 0 to 4. At least one of $R_1$, $R_2$ and $R_3$ stands for a group containing a fluorine atom and n stands for an integer of from 0 to 4. If at least one of $R_1$, $R_2$ and $R_3$ has 13 or more carbon atoms or if at least one of m, n and l is 5 or more, it becomes difficult to produce such compounds. Preferably, the number of the fluorine atoms contained in at least one of the groups $R_1$, $R_2$ and $R_3$ is 3 or more.

Examples of the carboxylic acid ester monomers of the above formula (I) wherein X stands for

preferably include 2-(methoxycarbonylethyl)-2',2',2'-trifluoroethyl acrylate, 2-(methoxycarbonylethyl)-1',1',1',3',3',3'-hexafluoroisopropyl acrylate, 2-(methoxycarbonylethyl)-1',1',2',2'-tetrahydroperfluorooctyl acrylate, 2-(methoxycarbonylethyl)-1',1',2',2'-tetrahydroperfluorodecyl acrylate, 2-(ethoxycarbonylethyl)-2',2',2'-trifluoroethyl acrylate, 2-(ethoxycarbonylethyl)-1',1',1',3',3',3'-hexafluoro-2-isopropyl acrylate, 2-(ethoxycarbonylethyl)-1',1',2',2'-tetrahydroperfluorooctyl acrylate, 2-(ethoxycarbonylethyl)-1',1',2',2'-tetrahydroperfluorodecyl acrylate, 2-(isopropyloxycarbonylethyl)-2',2',2'-trifluoroethyl acrylate, 2-isopropyloxycarbonylethyl)-1',1',1',3',3',3'-hexafluoro-2-isopropyl acrylate, 2-(isopropyloxycarbonylethyl)-1',1',5'-trihydroperfluoropentyl acrylate, 2-(isopropyloxycarbonylethyl)-1',1',2',2'-tetrahydroperfluorooctyl acrylate, 2-(isopropyloxycarbonylethyl)-1',1',2',2'-tetrahydroperfluorodecyl acrylate, 2-(tert-butyloxycarbonylethyl)-2',2',2'-trifluoroethyl acrylate, 2-(tert-butyloxycarbonylethyl)-1',1',1',3',3',3'-hexafluoro-2-isopropyl acrylate, 2-tert-butyloxycarbonylethyl)-1',1',2',2'-tetrahydroperfluorooctyl acrylate, 2-(tert-butyloxycarbonylethyl)-1',1',2',2'-tetrahydroperfluorodecyl acrylate, 2-(2',2',2'-trifluoroethyloxycarbonylethyl)ethyl acrylate, 2-(2',2',2'-trifluoroethyloxycarbonylethyl) isopropyl acrylate, 2-(1',1',1',3',3',3'-hexafluoro-2-isopropyloxycarbonylethyl)ethyl acrylate, 2-(1',1',2',2'-tetrahydroperfluorooctyloxycarbonylethyl)ethyl acrylate, 2-(2',2',2'-trifluoroethyloxycarbonylethyl)tert-butyl acrylate, 2-(1',1',2',2'-tetrahydroperfluorooctyloxycarbonylethyl) isopropyl acrylate, 2-(2',2',2'-trifluoroethyloxycarbonylethyl)-2",2",2"-trifluoroethyl acrylate, 2-(1',1',1',3',3',3'-hexafluoro-2-isopropyloxycarbonylethyl)-1",1",1",3",3",3"-hexafluoroisopropyl acrylate, 2-(1',1',2',2'-tetrafluoropropyloxycarbonylethyl)-1",1",2",2"-tetrafluoropropyl acrylate, and 2-(1',1',5'-trihydroperfluoropentyloxycarbonylethyl)- 1",1",5"-trihydroperfluoropentyl acrylate.

Examples of the carboxylic acid ester monomers of the above formula (I) wherein X stands for

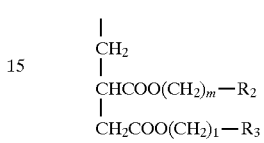

preferably include 2-(2',2',2'-trifluoroethoxycarbonyl)-4,5-di(isopropyloxycarbonyl)-1-pentene, 2-(1',1',1',3',3',3'-hexafluoroisopropyloxycarbonyl)-4,5-di(tert-butyloxycarbonyl)-1-pentene, 2-(1',1',5'-trihydroperfluoropentyloxycarbonyl)-4,5-di(tert-butyloxycarbonyl)-1-pentene, 2-(1',1',2',2'-tetrahydroperfluorodecyloxycarbonyl)-4,5-di(ethoxycarbonyl)-1-pentene, 2-(2',2',2'-trifluoroethyloxycarbonyl)-4,5-di(1',1',1',3',3',3'-hexafluoroisopropyloxycarbonyl)-1-pentene, 2-(1',1',1',3',3',3'-hexafluoroisopropyloxycarbonyl)-4,5-di(2',2',2'-trifluoroethyloxycarbonyl)-1-pentene, 2-(2',2',2'-trifluoroethyloxycarbonyl)-4,5-di(1',1',5'-trihydroperfluoropentyloxycarbonyl)-1-pentene, 2-(1',1',2',2'-tetrahydroperfluorodecyloxycarbonyl)-4,5-di(2',2',2'-trifluoroethyloxycarbonyl)-1-pentene, 2,4,5-tri(2',2',2'-trifluoroethyloxycarbonyl)-1-pentene, 2,4,5-tri(1',1',1',3',3',3'-hexafluoroisopropyloxycarbonyl)-1-pentene, 2,5-di(2',2',2'-trifluoroethyloxycarbonyl)-4-(1',1',1',3',3',3'-hexafluoroisopropyloxycarbonyl- 1-pentene and 2,5-di(2',2',2'-trifluoroethyloxycarbonyl)-4-(1',1',5'-trihydroperfluoropentyloxycarbonyl)-1-pentene.

Examples of the carboxylic acid ester monomers of the above formula (I) wherein X denotes

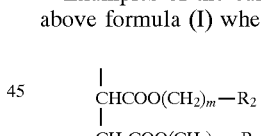

preferably include 2-(2',2',2'-trifluoroethoxycarbonyl)-3,4-di(isopropyloxycarbonyl)-1-butene, 2-(1',1',1',3',3',3'-hexafluoroisopropyloxycarbonyl)-3,4-di(tert-butyloxycarbonyl)-1-butene, 2-(1',1',5'-trihydroperfluoropentyloxycarbonyl)-3,4-di(tert-butyloxycarbonyl)-1-butene, 2-(1',1',2',2'-tetrahydroperfluorodecyloxycarbonyl)-3,4-di(ethoxycarbonyl)-1-butene, 2-(2',2',2'-trifluoroethoxycarbonyl)-3,4-di(1',1',1',3',3',3'-hexafluoroisopropyloxycarbonyl)-1-butene, 2-(1',1',1',3',3',3'-hexafluoroisopropyloxycarbonyl)-3,4-di(2',2',2'-trifluoroethyloxycarbonyl)-1-butene, 2-(2',2',2'-trifluoroethoxycarbonyl)-3,4-di(1',1',5'-trihydroperfluoropentyloxycarbonyl)-1-butene, 2-(1',1',2',2'-tetrahydroperfluorodecyloxycarbonyl)-3,4-di(2',2',2'-trifluoroethyloxycarbonyl)-1-butene, 2,3,4-tri(2',2',2'-trifluoroethoxycarbonyl)-1-butene, 2,3,4-tri(1',1',1',3',3',3'-hexafluoroisopropyloxycarbonyl)-1-butene, 2,4-di(2',2',2'-trifluoroethoxycarbonyl)-3-(1',1',1',3',3',3'- hexafluoroisopropyloxycarbonyl)-1-butene and 2,4-di(2',2', 2'-trifluoroethoxycarbonyl)-3-(1',1',5'-trihydroperfluoropentyloxycarbonyl)-1-butene.

Examples of the carboxylic acid ester monomers of the above formula (I) wherein X denotes

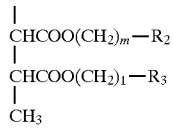

preferably include 2-(2',2',2'-trifluoroethoxycarbonyl)-3,4-di(isopropyloxycarbonyl)-1-pentene, 2-(1',1',1',3',3',3'-hexafluoroisopropyloxycarbonyl)-3,4-di(tert-butyloxycarbonyl)-1-pentene, 2-(1',1',5'-trihydroperfluoropentyloxycarbonyl)-3,4-di(tert-butyloxycarbonyl)-1-pentene, 2-(1',1',2',2'-tetrahydroperfluorodecyloxycarbonyl)-3,4-di(ethoxycarbonyl)-1-pentene, 2-(2',2',2'-trifluoroethoxycarbonyl)-3,4-di(1',1',1',3',3',3'-hexafluoroisopropyloxycarbonyl)-1-pentene, 2-(1',1',1',3',3',3'-hexafluoroisopropyloxycarbonyl)-3,4-di(2',2',2'-trifluoroethyloxycarbonyl)-1-pentene, 2-(2',2',2'-trifluoroethoxycarbonyl)-3,4-di(1',1',5'-trihydroperfluoropentyloxycarbonyl)-1-pentene, 2-(1',1',2',2'-tetrahydroperfluorodecyloxycarbonyl)-3,4-di(2',2',2'-trifluoroethyloxycarbonyl)-1-pentene, 2,3,4-tri(2',2',2'-trifluoroethoxycarbonyl)-1-pentene, 2,3,4-tri(1',1',1',3',3',3'-hexafluoroisopropyloxycarbonyl)-1-pentene, 2,4-di(2',2',2'-trifluoroethoxycarbonyl)-3-(1',1',1',3',3',3'-hexafluoroisopropyloxycarbonyl)-1-pentene and 2,4-di(2',2',2'-trifluoroethoxycarbonyl)-3-(1',1',5'-trihydroperfluoropentyloxycarbonyl)-1-pentene.

The aforementioned carboxylic acid ester monomer as one of the copolymerization components may be used either singly or as a mixture and is contained in an amount ranging between 2 and 95 wt. % based on the total feed monomers. If the amount of the carboxylic acid ester monomer is less than 2 wt. %, oxygen permeability is drastically lowered, whereas, if the amount of the monomer exceeds 95 wt. %, the comonomer cannot be used as the lens material because the strength required of the contact lens cannot be maintained and water-repellency is increased on account of the content of fluorine atoms.

According to the present invention, the carboxylic acid ester monomer, which is the indispensable monomer component and which is represented by the formula (I), may be prepared by the conventional methods. For example, the carboxylic acid ester monomer of the formula (I) wherein X denotes

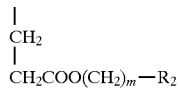

may be prepared by dissolving fluoroalkyl acrylate in a solvent dioxane and allowing the reaction to proceed at approximately 90° C. for about seven hours under an inert gas atmosphere in the presence of a tertiary phosphine as a catalyst. On the other hand, the carboxylic acid ester monomer of the formula wherein X denotes

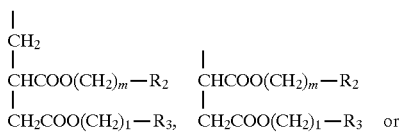

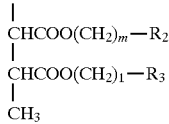

may be prepared by dissolving alkyl- or fluoroalkyl acrylate and alkyl- or fluoroalkyl itaconate in a solvent such as dioxane and allowing the reaction to proceed at approximately 90° C. for about seven hours under an inert gas atmosphere in the presence of a catalyst such as tertiary phosphine.

With the contact lens of the present invention, any copolymerizable monomers other than the carboxylic acid ester monomer represented by the formula (I) may be used, on the condition that the carboxylic acid ester monomer of the formula (I) is contained as the indispensable feed monomer. However, in view of thermal stability, mechanical strength and machinability of the produced contact lens, radically polymerizable vinyl monomers, silicon-containing vinyl monomers, fluorine-containing vinyl monomers, cross-linkable polyfunctional vinyl monomers, or mixtures thereof, may be preferably used as the copolymerizable monomers besides the aforementioned indispensable feed monomer. Examples of the radically polymerizable vinyl monomers, silicon-containing vinyl monomers, fluorine-containing vinyl monomers and cross-linkable polyfunctional vinyl monomers other than the indispensable feed monomer preferably include methyl (meth)acrylate, ethyl (meth)acrylate, isopropyl (meth)acrylate, tert-butyl (meth)acrylate, cyclohexyl (meth)acrylate, benzyl (meth)acrylate, styrene, p-methylstyrene, p-chlorostyrene, o-chlorostyrene, divinylbenzene, vinyl acetate, vinyl propionate, vinyl pivalate, vinyl (meth)acrylate, allyl (meth)acrylate, 2,2,2-trifluoroethyl (meth)acrylate, ethyl vinyl ether, n-butylvinyl ether, (meth)acrylic amide, 2-hydroxyethyl (meth)acrylate, N-vinyl pyrrolidone, vinyl pyridine, allyl (meth)acrylate, trimethylsilylmethyl (meth)acrylate, pentamethyl disiloxanylmethyl (meth)acrylate, methylbis(trimethylsiloxy)silylmethyl (meth)acrylate, tris(trimethylsiloxy)silylmethyl (meth)acrylate, tris(pentamethyldisiloxanyloxy)silylmethyl (meth)acrylate, trimethylsilylethyl (meth)acrylate, pentamethyldisiloxanylethyl (meth)acrylate, methylbis (trimethylsiloxy)silylethyl (meth)acrylate, tris (trimethylsiloxy)silylethyl (meth)acrylate, tris(pentamethyl disiloxanyloxy)silylethyl (meth)acrylate, trimethylsilylpropyl (meth)acrylate, pentamethyldisiloxanyl (meth)acrylate, methylbis(trimethylsiloxy)silylpropyl (meth)acrylate, tris (trimethylsiloxy)silylpropyl(meth)acrylate, tris (pentamethyldisiloxanyloxy)silylpropyl (meth)acrylate, methylbis(trimethylsiloxy)silylethylglycerolmono (meth)acrylate, tris(trimethylsiloxy)silylethylglycerolmono (meth)acrylate, tris(pentamethyldisiloxanyloxy) silylethylglycerolmono (meth)acrylate, methylbis (trimethylsiloxy)silylpropylglycerolmono (meth)acrylate, tris(trimethylsiloxy)silylglycerolmono (meth)acrylate, tris (pentamethyldisiloxanyloxy)silylpropylglycerolmono (meth)acrylate, dimethyl(triphenylsiloxy)silylpropyl (meth)acrylate, 2,2,2-trifluoroethyl (meth)acrylate, 2,2,2-trifluoro-1-trifluoromethyl (meth)acrylate, 3,3,4,4,5,5,6,6,6-nonafluorohexyl (meth)acrylate, 2,2,3,3,4,4,5,5- octafluoropentyl (meth)acrylate, 1,1,2,2-tetrahydroperfluorooctyl (meth)acrylate, ethyleneglycol di(meth)acrylate, diethyleneglycoldi(meth)acrylate, triethyleneglycol di(meth)acrylate, dipropyleneglycol di(meth)acrylate, diallyl phthalate, diallyl isofumarate, diallyl terephthalate, diethyleneglycolbisallyl carbonate, triallyl trimellitate, triallyl cyanurate, diisopropyl itaconate, ditertbutyl itaconate, di-2,2,2-trifluoroethyl itaconate, ethyl tristrimethylsiloxysilylpropyl itaconate, diisopropyl mesaconate, ditert-butyl mesaconate, di-2,2,2-trifluoroethyl mesaconate, isopropyl-1,1,2,2-tetrahydroperfluorodecyl mesaconate, isopropyl-tristrimethylsiloxysilylpropyl mesaconate, ditert-butyl fumarate, di-2,2,2-trifluoroethyl fumarate, isopropyl-3,3,4,4,5,5,6,6,7,7,8,8,9,9,10,10,10-heptadecafluorodecyl fumarate, tert-butyl-tristrimethylsiloxysilylpropyl fumarate, methacrylic acid, acrylic acid and itaconic acid. These may be used alone or as a mixture.

The content of the copolymerizable monomers other than the aforementioned indispensable feed monomer is 98 to 5%, preferably 85 to 5 wt. % based on the total weight of the total components. If the above content is less than 5 wt. %, sufficient thermal stability, mechanical strength or machinability cannot be obtained as a result of copolymerization. The above content in excess of 98 wt. % is also not desirable since oxygen permeability of the contact lens is drastically lowered.

For affording excellent oxygen permeability to the contact lens of the present invention, the DK value is preferably 6 to $12 \times 10^{-10}$ ml.cm/cm$^2$.sec.mmHg and more preferably 7 to $11 \times 10^{-10}$ ml.cm/cm$^2$.sec.mmHg when the carboxylic acid ester monomer of the formula (I) wherein X

is used as the copolymerization component. On the other hand, when the carboxylic acid ester monomer of the formula (I) wherein X denotes

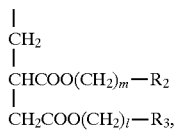

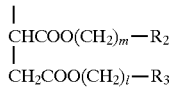

or

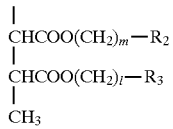

is used, the DK value is preferably 6 to $15 \times 10^{-10}$ ml.cm/cm$^2$.sec.mmHg and more preferably 8 to $14 \times 10^{-10}$ ml.cm/cm$^2$.sec.mmHg. If the DK value is less than the above range, the lens cannot be worn continuously for a long time because of insufficient oxygen permeability, whereas, if the DK value is in excess of the above range, certain physical properties of the lens, such as strength, are undesirably lowered.

The contact lens of the present invention may be prepared by any methods which are known per se. For example, the feed monomers may be polymerized in a suitable vessel, such as a test tube, along with a polymerization initiator, to produce a round rod or a block, which is then machined or ground to produce a contact lens. Alternatively, the feed monomers may be charged into a mold along with a polymerization initiator and directly formed in to a contact lens by mold polymerization. Still alternatively, a polymer is produced in advance by, for example, radical polymerization, and the polymer is dissolved in a suitable solvent, which is then removed to produce the contact lens. With these methods, the polymerization initiator may be one or more selected from the group consisting of azo compounds or organic peroxides having a decomposition temperature of 120° C. or less at selected half-life value for ten hours. The aforementioned azo compounds or organic peroxides may include, for example, benzoyl peroxide, diisopropyl peroxydicarbonate, t-butylperoxy-2-ethyl hexanoate, t-butylperoxy pivalate, t-butylperoxy diisobutylate, lauroyl peroxide, azobisisobutyronitrile, azobis(2,4-dimethylvaleronitrile) and t-butylperoxyisopropyl carbonate. These polymerization initiators may be used in an amount preferably not more than 10 parts by weight and more preferably not more than 5 parts by weight to 100 parts by weight of the feed monomers.

With the above methods, the monomer components are preferably copolymerized under a deaerating condition or an atomsphere of inert gases, such as nitrogen, carbon dioxide or helium or under such condition that the atmosphere in the polymerization system is replaced by these inert gases. The copolymerization temperature is preferably in the range of from 30° C. to 120° C. depending on the type of the polymerization initiator employed. The total polymerization time is preferably in the range of from 10 to 72 hours.

Colorants such as dyestuffs or additives such as UV absorbers may also be added to the feed monomers prior to polymerization.

In accordance with the present invention, the contact lens obtained by the above mentioned methods may be surface-modified by treatment with an acid or an alkali or low temperature plasma processing. The wearing feel of the contact lens may also be improved by graft polymerization of hydrophilic monomers by low temperature plasma processing.

The contact lens of the present invention, which makes use of a specific carboxylic acid ester polymer, has excellent properties as compared to the conventional contact lens, such as higher oxygen permeability or more effective prevention of deposition of protein, lipids or inorganic materials on the lens surface.

EXAMPLES OF THE INVENTION

The present invention will be explained in more detail with reference to Examples and Comparative Examples. These Examples, however, are given only for the sake of illustration and are not to be interpreted in a limiting sense.

In these Examples, parts are indicated by weight.

Example 1-1

40 parts of 2-(isopropyloxycarbonylethyl)-1',1',5'-trihydroperfluoropentyl acrylate, 15 parts of tristrimethylsiloxysilylpropyl methacrylate, 15 parts of 1,1,2,2-tetrahydroperfluorodecyl methacrylate, 20 parts of ethyl methacrylate, 5 parts of allyl methacrylate and 5 parts of methacrylic acid were mixed with 1.0 part of azobis(2,4- dimethylvaleronitrile). The resulting mixture was charged into a glass seal tube, which was melt-sealed under vacuum after atmosphere substitution by nitrogen and repeated deaeration. This sealed tube was placed stationarily for 24 hours in a constant temperature vessel maintained at 70° C. for polymerization and further heated at 100° C. for two hours. The produced polymer was cut, machined and ground to produce a contact lens. Various physical properties of the produced contact lens were measured by the following methods. Table 1-1 shows the amounts of the feed monomers, while Table 1-2 shows the results of measurement.

Coefficient of Oxygen Permeability (DK value)

The DK value in cc.cm/cm$^2$.sec.mmHg was measured of a test contact lens having a diameter of 12.7 mm and a thickness of 0.2 mm at 35° C. in 0.9% physiological saline, using a multirange analyzer for dissolved oxygen sold by Xertex Corporation under a trade name of MODEL 2110.

Resistance to contamination

A test contact lens having a diameter of 12.7 mm and a thickness of 0.2 mm was immersed at 37° C. for 24 hours in a 0.2% aqueous solution of egg white lysozyme and changes in absorbance at 280 nm were measured to find the affixed amount of egg white lysozyme.

Vickers hardness (HV)

The Vickers hardness was measured using a Terasowa MM-2 type micro hardness tester manufactured by Taiyo Tester Co., Ltd.

Mechanical Strength

The mechanical strengths of a flat plate sample 2 mm thick, 50 mm long and 10 mm wide, which was prepared separately by polymerization, were measured in accordance with the testing method for bending hard plastics prescribed in JIS K7203.

Examples 1-2 to 1-5 and Comparative Examples 1–1 to 1–3

By using the method similar to that of Example 1-1, the various feed monomers shown in Table 1-1 were cured using radical polymerization initiators shown in Table 1-1. Contact lenses were prepared from the cured mass and various physical properties thereof were measured. Table 1-1 shows the amounts of the feed monomers and the polymerization initiators, while Table 1-2 shows the results of measurement.

The following are abbreviations of the components shown in Tables 1-1, 2-1, 3-1 and 4-1.

DF3-A: 2-(2',2',2'-trifluoroethyloxycarbonylethyl)-2",2",2"-trifluoroethyl acrylate;

iPF8-A: 2-(isopropyloxycarbonylethyl)-1',1',5'-trihydroperfluoropentyl acrylate;

tBF17-A: 2-(tert-butyloxycarbonylethyl)-1',1',2',2'-tetrahydroperfluorodecyl acrylate;

Si-MA: tristrimethylsiloxysilylpropyl methacrylate;

F3-MA: 2,2,2-trifluoroethyl methacrylate;

F6-MA: 1,1,1,3,3,3-hexafluoroisopropyl methacrylate;

F17-MA: 1,1,2,2-tetrahydroperfluorodecyl methacrylate;

Si-Fu: isopropyl-tristrimethylsiloxysilylpropyl fumarate;

MMA: methyl methacrylate;

EMA: ethyl methacrylate;

A-MA: allyl methacrylate;

V-MA: vinyl methacrylate;

MA: methacrylic acid;

AA: acrylic acid;

ABVN azobis(2,4-dimethylvaleronitrile);

IPP: diisopropylperoxydicarbonate;

BPO: benzoyl peroxide;

TF3-$A_1$: 2,4,5-tri(2',2',2'-trifluoroethoxycarbonyl)-1-pentene;

TF6-$A_1$: 2,4,5-tri(1',1',1',3',3',3'-hexafluoroisopropyloxycarbonyl)-1-pentene;

F8/DF6-$A_1$: 2-(1',1',5'-trihydroperfluoropentyloxycarbonyl)-4,5-di(1',1',1',3',3',3'-hexafluoroisopropyloxycarbonyl)-1-pentene;

F17/DE-$A_1$: 2-(1',1',2',2'-tetrahydroperfluorodecyloxycarbonyl)-4,5-di(ethoxycarbonyl)-1-pentene;

F17-Fu: isopropyl-1,1,2,2-tetrahydroperfluorodecyl fumarate;

TF3-$A_2$: 2,3,4-tri(2',2',2'-trifluoroethoxycarbonyl)-1-butene;

TF6-$A_2$: 2,3,4-tri(1',1',1',3',3',3'-hexafluoroisopropyloxycarbonyl)-1-butene;

F8/DF6-$A_2$: 2-(1',1',5'-trihydroperfluoropentyloxycarbonyl)-3,4-di(1',1',1',3',3',3'-hexafluoroisopropyloxycarbonyl)-1-butene;

F17/DE-$A_2$: 2-(1',1',2',2'-tetrahydroperfluorodecyloxycarbonyl)-3,4-di(ethoxycarbonyl)-1-butene;

TF3-$A_3$: 2,3,4-tri(2',2',2'-trifluoroethoxycarbonyl)-1-pentene;

TF6-$A_3$: 2,3,4-tri(1',1',1',3',3',3'-hexafluoroisopropyloxycarbonyl)-1-pentene;

F8/DF6-$A_3$: 2-(1',1',5'-trihydroperfluoropentyloxycarbonyl)-3,4-di(1',1',1',3',3',3'-hexafluoroisopropyloxycarbonyl)-1-pentene;

F17/DE-$A_3$: 2-(1',1',2',2'-tetrahydroperfluorodecyloxycarbonyl)-3,4-di(ethoxycarbonyl)-1-pentene.

TABLE 1 - 1

|  | Example | | | | | Comparative Example | | |
|---|---|---|---|---|---|---|---|---|
|  | 1-1 | 1-2 | 1-3 | 1-4 | 1-5 | 1-1 | 1-2 | 1-3 |
| DF3-A |  | 35 |  | 30 |  |  |  |  |
| iPF8-A | 40 |  |  | 30 |  |  |  |  |
| tBF17-A |  |  | 35 |  | 35 |  |  |  |
| Si-MA | 15 | 25 |  | 10 | 15 | 40 | 45 |  |
| F3-MA |  |  |  |  |  |  | 45 |  |
| F6-MA |  |  | 20 |  |  |  |  |  |
| F17-MA | 15 | 10 |  |  |  |  |  | 30 |
| Si-Fu |  |  | 20 |  | 20 |  |  |  |
| MMA |  | 20 | 15 | 20 |  | 50 |  | 60 |
| EMA | 20 |  |  |  | 20 |  |  |  |
| A-MA | 5 |  |  | 5 |  |  | 5 |  |
| V-MA |  | 5 | 5 |  | 5 | 5 |  | 5 |
| MA | 5 |  |  |  | 5 |  | 5 |  |
| AA |  | 5 | 5 | 5 |  | 5 |  | 5 |
| ABVN | 1.5 | 1.5 |  |  |  | 1.5 |  |  |
| IPP |  |  | 1.0 |  | 1.0 |  | 1.0 |  |
| BPO |  |  |  | 1.0 |  |  |  | 1.0 |

(Units are by weight parts)

TABLE 1 - 2

|  | DK value (*1) | Resistance to Contamination | HV | Bending Stress (*2) | Modulus of Elasticity (*3) |
|---|---|---|---|---|---|
| Ex. 1-1 | 10.1 | Good | 8.9 | 8.7 | 1110 |
| Ex. 1-2 | 9.7 | Good | 8.6 | 8.7 | 1240 |
| Ex. 1-3 | 10.5 | Good | 8.4 | 9.6 | 1030 |
| Ex. 1-4 | 8.9 | Good | 9.5 | 9.3 | 1270 |
| Ex. 1-5 | 10.2 | Good | 8.1 | 7.9 | 1130 |
| Comp. Ex. 1-1 | 2.4 | Good | 8.6 | 7.8 | 1280 |
| Comp. Ex. 1-2 | 5.4 | 1.2 μg/cm$^2$ | 7.1 | 6.2 | 780 |
| Comp. Ex. 1-3 | 2.0 | Good | 9.8 | 8.3 | 1310 |

(*1) ×10$^{-10}$ ml · cm/cm$^2$ · sec · mmHg
(*2) kgf/mm$^2$
(*3) N/mm$^2$

It is seen from the results of Table 1–2 that the contact lens of the present invention is markedly superior in oxygen permeability while being superior in resistance to contamination.

Example 2-1

35 parts of 2,4,5-tri(1',1',1',3',3',3'-hexafluoroisopropyloxycarbonyl)-1-pentene, 35 parts of tristrimethylsiloxysilylpropyl methacrylate, 20 parts of methyl methacrylate, 5 parts of allyl methacrylate and 5 parts of methacrylic acid were mixed with 1.0 part of azobis(2,4-dimethylvaleronitrile). The resulting mixture was charged into a glass seal tube, which was melt-sealed under vacuum after atmosphere substitution by nitrogen and repeated deaeration. This sealed tube was placed stationarily for 24 hours in a constant temperature vessel maintained at 70° C. for polymerization and further heated at 100° C. for two hours. The produced polymer was cut, machined and ground to produce a contact lens. Various physical properties of the produced contact lens were measured by the method similar to that used in Example 1—1. Table 2–1 shows the relative amounts of the feed monomer and polymerization initiator, while Table 2—2 shows the results of measurement.

Examples 2-2 to 2-5

By using the method similar to that of Example 2-1, the various feed monomers shown in Table 2-1 were cured using radical polymerization initiators shown in Table 2-1 under polymerization conditions. Contact lenses were prepared from the cured mass and various physical properties thereof were measured. Table 2-1 shows the amounts of the feed monomers and the polymerization initiators, while Table 2-2 shows the results of measurement.

TABLE 2-1

|  | Example | | | | |
|---|---|---|---|---|---|
|  | 2-1 | 2-2 | 2-3 | 2-4 | 2-5 |
| TF3-A$_1$ |  | 20 |  |  | 20 |
| TF6-A$_1$ | 35 |  |  |  |  |
| F8/DF6-A$_1$ |  |  | 30 |  | 20 |
| F17/DE-A$_1$ |  |  |  | 25 |  |
| Si-MA | 35 | 40 |  | 25 | 20 |
| F6-MA |  |  | 30 | 25 |  |
| F17-MA |  | 15 |  |  | 10 |
| Si-Fu |  |  | 15 |  |  |
| MMA | 20 | 15 |  | 15 |  |
| EMA |  |  | 15 |  | 20 |
| A-MA | 5 |  |  | 5 |  |
| V-MA |  | 5 | 5 |  | 5 |
| MA | 5 |  |  |  | 5 |
| AA |  | 5 | 5 | 5 |  |
| ABVN | 1.0 | 1.5 |  |  |  |
| IPP |  |  | 1.0 |  | 1.0 |
| BPO |  |  |  | 1.0 |  |

(Units are by weight parts)

TABLE 2-2

|  | DK value (*1) | Resistance to Contamination | HV | Bending Stress (*2) | Modulus of Elasticity (*3) |
|---|---|---|---|---|---|
| Ex. 2-1 | 10.3 | Good | 8.6 | 8.7 | 1110 |
| Ex. 2-2 | 11.0 | Good | 8.6 | 8.7 | 1240 |
| Ex. 2-3 | 12.1 | Good | 8.4 | 9.6 | 1030 |
| Ex. 2-4 | 9.7 | Good | 9.2 | 9.3 | 1270 |
| Ex. 2-5 | 9.4 | Good | 8.8 | 7.9 | 1030 |

(*1) ×10$^{-10}$ ml · cm/cm$^2$ · sec · mmHg
(*2) kgf/mm$^2$
(*3) N/mm$^2$

Example 3-1

35 parts of 2,3,4-tri(1',1',1',3',3',3'-hexafluoroisopropyloxycarbonyl)-1-butene, 35 parts of tristrimethylsiloxysilylpropyl methacrylate, 20 parts of methyl methacrylate, 5 parts of allyl methacrylate and 5 parts of methacrylic acid were mixed with 1.0 part of azobis(2,4-dimethylvaleronitrile). The resulting mixture was charged into a glass seal tube, which was melt-sealed under vacuum after atmosphere substitution by nitrogen and repeated deaeration. This sealed tube was placed stationarily for 24 hours in a constant temperature vessel maintained at 70° C. for polymerization and further heated at 100° C. for two hours. The produced polymer was cut, machined and ground to produce a contact lens. Various physical properties of the produced contact lens were measured by the method similar to that used in Example 1-1. Table 3-1 shows the relative amounts of the feed monomer and polymerization initiator, while Table 3-2 shows the results of measurement.

Examples 3-2 to 3-5

By using the method similar to that of Example 3-1, the various feed monomers shown in Table 3-1 were cured using radical polymerization initiators shown in Table 3-1 under polymerization conditions. Contact lenses were prepared from the cured mass and various physical properties thereof were measured. Table 3-1 shows the amounts of the feed monomers and the polymerization initiators, while Table 3-2 shows the results of measurement.

TABLE 3-1

| | Examples | | | | |
|---|---|---|---|---|---|
| | 3-1 | 3-2 | 3-3 | 3-4 | 3-5 |
| TF3-A$_2$ | | 20 | | | 20 |
| TF6-A$_2$ | 35 | | | | |
| F8/DF6-A$_2$ | | | 30 | | 20 |
| F17/DE-A$_2$ | | | | 25 | |
| Si-MA | 35 | 40 | | 25 | 20 |
| F6-MA | | | 30 | 25 | |
| F17-MA | | 15 | | 25 | 10 |
| Si-Fu | | | 15 | | |
| MMA | 20 | 15 | | 15 | |
| EMA | | | 15 | | 20 |
| A-MA | 5 | | | 5 | |
| V-MA | | | 5 | 5 | 5 |
| MA | 5 | | | | 5 |
| AA | | 5 | 5 | 5 | |
| ABVN | 1.0 | 1.5 | | | |
| IPP | | | 1.0 | | 1.0 |
| BPO | | | | 1.0 | |

(Units are by weight parts)

TABLE 3-2

| | DK value (*1) | Resistance to Contamination | HV | Bending Stress (*2) | Modulus of Elasticity (*3) |
|---|---|---|---|---|---|
| Ex. 3-1 | 10.3 | Good | 8.6 | 8.7 | 1110 |
| Ex. 3-2 | 11.0 | Good | 8.6 | 8.7 | 1240 |
| Ex. 3-3 | 12.1 | Good | 8.4 | 9.6 | 1030 |
| Ex. 3-4 | 9.7 | Good | 9.2 | 9.3 | 1270 |
| Ex. 3-5 | 9.4 | Good | 8.8 | 7.9 | 1030 |

(*1) ×10$^{-10}$ ml · cm/cm$^2$ · sec · mmHg
(*2) kgf/mm$^2$
(*3) N/mm$^2$

Example 4-1

35 parts of 2,3,4-tri(1',1',1',3',3',3'-hexafluoroisopropyloxycarbonyl)-1-pentene, 35 parts of tristrimethylsiloxysilylpropyl methacrylate, 20 parts of methyl methacrylate, 5 parts of allyl methacrylate and 5 parts of methacrylic acid were mixed with 1.0 part of azobis(2,4-dimethylvaleronitrile). The resulting mixture was charged into a glass seal tube, which was melt-sealed under vacuum after atmosphere substitution by nitrogen and repeated deaeration. This sealed tube was placed stationarily for 24 hours in a constant temperature vessel maintained at 70° C. for polymerization and further heated at 100° C. for two hours. The produced polymer was cut, machined and ground to produce a contact lens. Various physical properties of the produced contact lens were measured by the method similar to that used in Example 1-1. Table 4-1 shows the relative amounts of the feed monomer and the polymerization initiator, while Table 4-2 shows the results of measurement.

Examples 4-2 to 4-5

By using the method similar to that of Example 4-1, the various feed monomers shown in Table 4-1 were cured using radical polymerization initiators shown in Table 4-1 under polymerization conditions. Contact lenses were prepared from the cured mass and various physical properties thereof were measured. Table 4-1 shows the amounts of the feed monomers and the polymerization initiators, while Table 4-2 shows the results of measurement.

TABLE 4-1

| | Example | | | | |
|---|---|---|---|---|---|
| | 4-1 | 4-2 | 4-3 | 4-4 | 4-5 |
| TF3-A$_3$ | | 20 | | | 20 |
| TF6-A$_3$ | 35 | | | | |
| F8/DF6-A$_3$ | | | 30 | | 20 |
| F17/DE-A$_3$ | | | | 25 | |
| Si-MA | 35 | 40 | | 25 | 20 |
| F6-MA | | | 30 | 25 | |
| F17-MA | | 15 | | | 10 |
| Si-Fu | | | 15 | | |
| MMA | 20 | 15 | | 15 | |
| EMA | | | 15 | | 20 |
| A-MA | 5 | | | 5 | |
| V-MA | | 5 | 5 | | 5 |
| MA | 5 | | | | 5 |
| AA | | | 5 | 5 | |
| ABVN | 1.0 | 1.5 | | | |
| TPP | | | 1.0 | | 1.0 |
| BPO | | | | 1.0 | |

(Units are by weight parts)

TABLE 4-2

| | DK value (*1) | Resistance to Contamination | HV | Bending Stress (*2) | Modulus of Elasticity (*3) |
|---|---|---|---|---|---|
| Ex. 4-1 | 10.0 | Good | 8.6 | 8.4 | 1020 |
| Ex. 4-2 | 11.0 | Good | 8.4 | 8.2 | 1190 |
| Ex. 4-3 | 11.3 | Good | 8.4 | 9.3 | 1036 |
| Ex. 4-4 | 9.1 | Good | 9.3 | 9.1 | 1240 |
| Ex. 4-5 | 9.1 | Good | 8.3 | 7.9 | 1020 |

(*1) ×10$^{-10}$ ml · cm/cm$^2$ · sec · mmHg
(*2) kgf/mm$^2$
(*3) N/mm$^2$

It is seen from the results of Tables 2-2, 3-2 and 4-2 that, as compared to the products of Comparative Examples 1-1 to 1-3, the contact lens of the present invention has a higher DK value and excellent oxygen permeability and resistance to contamination besides moderate physical strength.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A hard contact lens consisting of a copolymer obtained by copolymerizing, as indispensable feed monomers, 20 to 60 wt. % of a carboxylic acid ester monomer, 10 to 40 wt. % of tris(trimethylsiloxy)silylpropyl(meth) acrylate and 30 to 55 wt. % of a copolymerizable monomer, said carboxylic acid ester monomer being represented by the formula (I)

wherein $R_1$ stands for a hydrogen atom, an alkyl group having 1 to 12 carbon atoms, an alkenyl group having 1 to 12 carbon atoms or a cyclic alkyl group having 3 to 12 carbon atoms, and X stands for

in which $R_2$ stands for a hydrogen atom, an alkyl group having 1 to 12 carbon atoms, an alkenyl group having 1 to 12 carbon atoms, a cyclic alkyl group having 3 to 12 carbon atoms or an aryl group, m being an integer of from 0 to 4, at least one of $R_1$ and $R_2$ being a group containing a fluorine atom and n being an integer of from 0 to 4, said copolymerizable monomer is selected from the group consisting of methyl(meth)acrylate, ethyl(meth)acrylate, isopropyl(meth)acrylate, tert-butyl(meth)acrylate, cyclohexyl(meth)acrylate, benzyl(meth)acrylate, styrene, p-methylstyrene, p-chlorostyrene, o-chlorostyrene, divinylbenzene, vinyl acetate, vinyl propionate, vinyl pivalate, vinyl(meth)acrylate, allyl (meth) acrylate, 2,2,2-trifluoroethyl(meth)acrylate, ethyl vinyl ether, n-butylvinyl ether, (meth)acrylic amide, 2-hydroxyethyl(meth)acrylate, N-vinyl pyrrolidone, vinyl pyridine, trimethylsilylmethyl(meth)acrylate, pentamethyl disiloxanylmethyl(meth)acrylate, methylbis(trimethylsiloxy)silylmethyl(meth)acrylate, tris(trimethylsiloxy)silylmethyl(meth)acrylate, tris(pentamethyldisiloxanyloxy)silylmethyl(meth)acrylate, trimethylsilylethyl(meth)acrylate, pentamethyldisiloxanylethyl(meth)acrylate, methylbis(trimethylsiloxy)silylethyl(meth)acrylate, tris(trimethylsiloxy)silylethyl(meth)acrylate, tris(pentamethyldisiloxanyloxy)silylethyl(meth)acrylate, trimethylsilylpropyl(meth)acrylate, pentamethyldisiloxanyl(meth)acrylate, methylbis-(trimethylsiloxy)silylpropyl(meth)acrylate, tris(pentamethyldisiloxanyloxy)silylpropyl(meth)acrylate, methylbis(trimethylsiloxy)silylethylglycerolmono (meth)acrylate, tris(trimethylsiloxy)silylethylglycerolmono(meth)acrylate, tris(pentamethyldisiloxanyloxy)silylethylglycerolmono(meth)acrylate, methylbis(trimethylsiloxy)silylpropylglycerolmono(meth)acrylate, tris(trimethylsiloxy)silylglycerolmono(meth)acrylate, tris(pentamethyldisiloxanyloxy) silypropylglycerolmono(meth)acrylate, dimethyl(triphenylsiloxy) silypropyl(meth)acrylate, 2,2,2-trifluoroethyl(meth)acrylate, 2,2,2-trifluoro-1-trifluoromethyl(meth)acrylate, 3,3,4,4,5,5,6, 6,6-nonafluorohexyl(meth)acrylate, 2,2,3,3,4,4,5,5-octafluoropentyl(meth)acrylate, 1,1,2,2-tetrahydroperfluorooctyl(meth)acrylate, ethyleneglycoldi(meth)acrylate, diethyleneglycoldi(meth)acrylate, triethyleneglycoldi(meth)acrylate, dipropyleneglycoldi(meth)acrylate, diallyl phthalate, diallyl isofumarate, diallylterephthalate, diethyleneglycolbisallylcarbonate, triallyl trimellitate, triallyl cyanurate, diisopropyl itaconate, ditert-butyl itaconate, di-2,2,2-trifluoroethyl itaconate, ethyl tristri-methylsiloxysilylpropyl itaconate, diisopropyl mesaconate, ditert-butyl mesaconate, di-2,2, 2-trifluoroethyl mesaconate, isopropyl-1, 1, 2, 2-tetrahydroperfluorodecyl mesaconate, isopropyl-tristrimethylsiloxysilylpropyl mesaconate, ditert-butyl fumarate, di-2,2,2-trifluoroethyl fumarate, isopropyl-3, 3,4,4,5,5,6,6,7,7,8,8,9,9,10,10,10-heptadecafluorodecyl fumarate, tert-butyl-tristrimethylsiloxysilylpropyl fumarate, methacrylic acid, acrylic acid, itaconic acid, and mixtures thereof.

2. The hard contact lens according to claim 1 wherein the carboxylic acid ester monomer of the formula (I) wherein X is

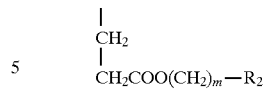

is selected from the group consisting of 2-(methoxycarbonylethyl)-2',2',2'-trifluoroethyl acrylate, 2-(methoxycarbonylethyl)-1',1',1',3',3',3'-hexafluoroisopropyl acrylate, 2-(methoxycarbonylethyl)-1', 1',2',2'-tetrahydroperfluorooctyl acrylate, 2-(methoxycarbonylethyl)-1',1',2',2'-tetrahydroperfluorodecyl acrylate, 2-(ethoxycarbonylethyl)-2',2',2'-trifluoroethyl acrylate, 2-(ethoxycarbonylethyl)-1',1', 1',3',3',3'-hexafluoro-2-isopropyl acrylate, 2-(ethoxycarbonylethyl)-1',1',2',2'-tetrahydroperfluorooctyl acrylate, 2-(ethoxycarbonylethyl)-1',1',2',2'-tetrahydroperfluorodecyl acrylate, 2-(isopropyloxycarbonylethyl)-2',2',2'-trifluoroethyl acrylate, 2-isopropyloxycarbonylethyl)-1',1',1',3',3',3'-hexafluoro-2-isopropyl acrylate, 2-(isopropyloxycarbonylethyl)-1',1',5'-trihydroperfluoropentyl acrylate, 2-(isopropyloxycarbonylethyl)-1',1',2',2'-tetrahydroperfluorooctyl acrylate, 2-(isopropyloxycarbonylethyl)-1',1',2',2'-tetrahydroperfluorodecyl acrylate, 2-(tert-butyloxycarbonylethyl)-2',2',2'-trifluoroethyl acrylate, 2-(tert-butyloxycarbonylethyl)-1',1',1',3',3',3'-hexafluoro-2-isopropyl acrylate, 2-tert-butyloxycarbonylethyl)-1',1',2',2'-tetrahydroperfluorooctyl acrylate, 2-(tert-butyloxycarbonylethyl)-1',1',2',2'-tetrahydroperfluorodecyl acrylate, 2-(2',2',2'-trifluoroethyloxycarbonylethyl)ethyl acrylate, 2-(2',2',2'-trifluoroethyloxycarbonylethyl) isopropyl acrylate, 2-(1',1',1',3',3',3'-hexafluoro-2-isopropyloxycarbonylethyl)ethyl acrylate, 2-(1',1',2',2'-tetrahydroperfluorooctyloxycarbonylethyl)ethyl acrylate, 2-(2',2',2'-trifluoroethyloxycarbonylethyl) tert-butyl acrylate, 2-(1',1',2',2'-tetrahydroperfluorooctyloxycarbonylethyl)isopropyl acrylate, 2-(2',2',2'-trifluoroethyloxycarbonylethyl)-2'',2'', 2''-trifluoroethyl acrylate, 2-(1',1',1',3',3',3'-hexafluoro-2-isopropyloxycarbonylethyl)-1'',1'',1'',3'',3'',3''-hexafluoroisopropyl acrylate, 2-(1',1',2',2'-tetrafluoropropyloxycarbonylethyl)-1'', 1'',2'',2''-tetrafluoropropyl acrylate, 2-(1',1',5'-trihydroperfluoropentyloxycarbonylethyl)-1'', 1'', 5''-trihydroperfluoropentyl acrylate, and mixtures thereof.

3. The hard contact lens according to claim 1 wherein the carboxylic acid ester monomer of the formula (I) wherein X stands for

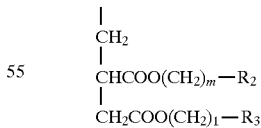

is selected from the group consisting of 2-(2',2',2'-trifluoroethoxycarbonyl)-4,5-di(isopropyloxycarbonyl)-1-pentene, 2-(1',1',1',3',3',3'-hexafluoroisopropyloxycarbonyl)-4,5-di(tert-butyloxycarbonyl)-1-pentene, 2-(1',1',5'-trihydroperfluoropentyloxycarbonyl)-4,5-di(tert-butyloxycarbonyl)-1-pentene, 2-(1',1',2',2'-tetrahydroperfluorodecyloxycarbonyl)-4,5-di(ethoxycarbonyl)-1-pentene, 2-(2',2',2'-trifluoroethyloxycarbonyl)-4,5-di(1',1',1',3',3',3'- hexafluoroisopropyloxycarbonyl)-1-pentene, 2-(1',1',1',3',3', 3'-hexafluoroisopropyloxycarbonyl)-4,5-di(2',2',2'- trifluoroethyloxycarbonyl)-1-pentene, 2-(2',2',2'- trifluoroethyloxycarbonyl)-4,5-di(1',1',5'- trihydroperfluoropentyloxycarbonyl)-1-pentene, 2-(1',1',2', 2'-tetrahydroperfluorodecyloxycarbonyl)-4,5-di(2',2',2'- trifluoroethyloxycarbonyl)-1-pentene, 2,4,5-tri(2',2',2'- trifluoroethyloxycarbonyl)-1-pentene, 2,4,5-tri(1',1',1',3',3', 3'-hexafluoroisopropyloxycarbonyl)-1-pentene, 2,5-di(2',2', 2'-trifluoroethyloxycarbonyl)-4-(1',1',1',3',3',3'- hexafluoroisopropyloxycarbonyl)-1-pentene, 2,5-di(2',2',2'- trifluoroethyloxycarbonyl)-4-(1',1',5'- trihydroperfluoropentyloxycarbonyl)-1-pentene, and mixtures thereof.

4. The hard contact lens according to claim 1 wherein the carboxylic acid ester monomer of the formula (I) wherein X stands for

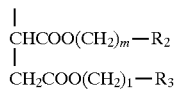

is selected from the group consisting of 2-(2',2',2'- trifluoroethoxycarbonyl)-3,4-di(isopropyloxycarbonyl)-1- butene, 2-(1',1',1',3',3',3'-hexafluoroisopropyloxycarbonyl)- 3,4-di(tert-butyloxycarbonyl)-1-butene, 2-(1',1',5'- trihydroperfluoropentyloxycarbonyl)-3,4-di(tert- butyloxycarbonyl)-1-butene, 2-(1',1',2',2'- tetrahydroperfluorodecyloxycarbonyl)-3,4-di (ethoxycarbonyl)-1-butene, 2-(2',2',2'- trifluoroethoxycarbonyl)-3,4-di(1',1',1',3',3',3'- hexafluoroisopropyloxycarbonyl)-1-butene, 2-(1',1',1',3',3', 3'-hexafluoroisopropyloxycarbonyl)-3,4-di(2',2',2'- trifluoroethyloxycarbonyl)-1-butene, 2-(2',2',2'- trifluoroethoxycarbonyl)-3,4-di(1',1',5'- trihydroperfluoropentyloxycarbonyl)-1-butene, 2-(1',1',2', 2'-tetrahydroperfluorodecyloxycarbonyl)-3,4-di(2',2',2'- trifluoroethyloxycarbonyl)-1-butene, 2,3,4-tri(2',2',2'- trifluoroethoxycarbonyl)-1-butene, 2,3,4-tri(1',1',1',3',3',3'- hexafluoroisopropyloxycarbonyl)-1-butene, 2,4-di(2',2',2'- trifluoroethoxycarbonyl)-3-(1',1',1',3',3',3'- hexafluoroisopropyloxycarbonyl)-1-butene, 2,4-di(2',2',2'- trifluoroethoxycarbonyl)-3-(1',1',5'- trihydroperfluoropentyloxycarbonyl)-1-butene, and mixtures thereof.

5. The hard contact lens according to claim 1 wherein the carboxylic acid ester monomer of the formula (I) wherein X stands for

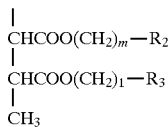

is selected from the group consisting of 2-(2',2',2'- trifluoroethoxycarbonyl)-3,4-di(isopropyloxycarbonyl)-1- pentene, 2-(1',1',1',3',3',3'-hexafluoroisopropyloxycarbonyl) -3,4-di(tert-butyloxycarbonyl)-1-pentene, 2-(1',1',5'- trihydroperfluoropentyloxycarbonyl)-3,4-di(tert- butyloxycarbonyl)-1-pentene, 2-(1',1',2',2'- tetrahydroperfluorodecyloxycarbonyl)-3,4-di (ethoxycarbonyl)-1-pentene, 2-(2',2',2'- trifluoroethoxycarbonyl)-3,4-di(1',1',1',3',3',3'- hexafluoroisopropyloxycarbonyl)-1-pentene, 2-(1',1',1',3',3', 3'-hexafluoroisopropyloxycarbonyl)-3,4-di(2',2',2'- trifluoroethyloxycarbonyl)-1-pentene, 2-(2',2',2'- trifluoroethoxycarbonyl)-3,4-di(1',1',5'- trihydroperfluoropentyloxycarbonyl)-1-pentene, 2-(1',1',2', 2'-tetrahydroperfluorodecyloxycarbonyl)-3,4-di(2',2',2'- trifluoroethyloxycarbonyl)-1-pentene, 2,3,4-tri(2',2',2'- trifluoroethoxycarbonyl)-1-pentene, 2,3,4-tri(1',1',1',3',3',3'- hexafluoroisopropyloxycarbonyl)-1-pentene, 2,4-di(2',2',2'- trifluoroethoxycarbonyl)-3-(1',1',1',3',3',3'- hexafluoroisopropyloxycarbonyl)-1-pentene, 2,4-di(2',2',2'- trifluoroethoxycarbonyl)-3-(1',1',5'- trihydroperfluoropentyloxycarbonyl)-1-pentene, and mixtures thereof.

* * * * *